United States Patent
Hinckley et al.

(10) Patent No.: US 7,289,102 B2
(45) Date of Patent: Oct. 30, 2007

(54) METHOD AND APPARATUS USING MULTIPLE SENSORS IN A DEVICE WITH A DISPLAY

(75) Inventors: Kenneth P. Hinckley, Redmond, WA (US); Michael J. Sinclair, Kirkland, WA (US); Jeffrey Scott Pierce, Pittsburgh, PA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 09/875,477

(22) Filed: Jun. 6, 2001

(65) Prior Publication Data

US 2002/0021278 A1  Feb. 21, 2002

Related U.S. Application Data

(60) Provisional application No. 60/218,748, filed on Jul. 17, 2000.

(51) Int. Cl.
*G09G 5/00* (2006.01)
(52) U.S. Cl. ............ 345/156; 345/157; 345/158; 345/160; 345/161; 345/163; 345/173
(58) Field of Classification Search ......... 345/156–172
See application file for complete search history.

(56) References Cited

U.S. PATENT DOCUMENTS

| | | | | |
|---|---|---|---|---|
| 4,504,701 A | | 3/1985 | Lucchesi | 379/373.02 |
| 5,329,577 A | | 7/1994 | Norimatsu | 455/567 |
| 5,337,353 A | | 8/1994 | Boi et al. | 379/433.01 |
| 5,481,595 A | | 1/1996 | Ohashi et al. | 379/67 |
| 5,602,566 A | * | 2/1997 | Motosyuku et al. | 345/684 |
| 5,657,372 A | | 8/1997 | Ahlberg et al. | 455/414 |
| 5,661,632 A | * | 8/1997 | Register | 361/683 |
| 5,689,665 A | | 11/1997 | Mitsui et al. | 395/342 |
| 5,705,997 A | * | 1/1998 | Park | 340/825.49 |
| 5,712,911 A | | 1/1998 | Her | 379/388.01 |
| 5,714,997 A | * | 2/1998 | Anderson | 348/39 |
| 5,761,071 A | * | 6/1998 | Bernstein et al. | 700/237 |
| 5,860,016 A | * | 1/1999 | Nookala et al. | 713/324 |

(Continued)

FOREIGN PATENT DOCUMENTS

JP  8-292826  * 11/1996

(Continued)

OTHER PUBLICATIONS

Bartlett, J.F., "Rock'n'Scroll Is Here to Stay," IEEE Computer Graphics and Applications, pp. 40-45, (May/Jun. 2000).

(Continued)

*Primary Examiner*—Richard Hjerpe
*Assistant Examiner*—Leonid Shapiro
(74) *Attorney, Agent, or Firm*—Theodore M. Magee; Westman, Champlin & Kelly, P.A.

(57) ABSTRACT

In a device having a display, at least one sensor signal is generated from a sensor in the device. One or more context values are then generated from the sensor signal. The context values indicate how the device is situated relative to one or more objects. At least one of the context values is then used to control the operation of one or more aspects of the device.

25 Claims, 6 Drawing Sheets

U.S. PATENT DOCUMENTS

| | | | |
|---|---|---|---|
| 5,910,882 A | 6/1999 | Burrell | 361/681 |
| 5,924,046 A | 7/1999 | Martensson | 455/567 |
| 5,963,952 A * | 10/1999 | Smith | 707/102 |
| 5,995,852 A | 11/1999 | Yasuda et al. | 455/567 |
| 6,137,468 A * | 10/2000 | Martinez et al. | 345/649 |
| 6,201,554 B1 * | 3/2001 | Lands | 345/169 |
| 6,216,016 B1 | 4/2001 | Cronin | 455/567 |
| 6,216,106 B1 | 4/2001 | John | 704/270 |
| 6,246,862 B1 | 6/2001 | Grivas et al. | 455/566 |
| 6,259,787 B1 | 7/2001 | Schulze | 455/352 |
| 6,288,704 B1 * | 9/2001 | Flack et al. | 345/158 |
| 6,292,674 B1 | 9/2001 | David | 455/550.1 |
| 6,304,765 B1 | 10/2001 | Cosgrove et al. | 455/575 |
| 6,310,955 B1 | 10/2001 | Reeves | 379/424 |
| 6,374,145 B1 * | 4/2002 | Lignoul | 700/17 |
| 6,381,540 B1 | 4/2002 | Beason et al. | 701/213 |
| 6,408,187 B1 | 6/2002 | Merriam | 455/458 |
| 6,426,736 B1 | 7/2002 | Ishihara | 455/566 |
| 6,449,363 B1 | 9/2002 | Kielsnia | 379/420.01 |
| 6,466,198 B1 * | 10/2002 | Feinstein | 345/158 |
| 6,509,907 B1 | 1/2003 | Kuwabara | 345/684 |
| 6,516,202 B1 | 2/2003 | Hawkins et al. | 455/556.2 |
| 6,532,447 B1 | 3/2003 | Christensson | 704/275 |
| 6,542,436 B1 | 4/2003 | Myllyla | 455/569.1 |
| 6,560,466 B1 | 5/2003 | Skorko | 455/567 |
| 6,567,068 B2 * | 5/2003 | Rekimoto | 345/156 |
| 6,567,101 B1 * | 5/2003 | Thomas | 345/649 |
| 6,573,883 B1 * | 6/2003 | Bartlett | 345/156 |
| 6,597,384 B1 * | 7/2003 | Harrison | 345/204 |
| 6,621,508 B1 * | 9/2003 | Shiraishi et al. | 715/810 |
| 6,621,800 B1 | 9/2003 | Klein | 370/282 |
| 6,624,824 B1 * | 9/2003 | Tognazzini et al. | 345/684 |
| 6,631,192 B1 | 10/2003 | Fukiharu | 379/433.07 |
| 6,658,272 B1 | 12/2003 | Lenchik et al. | 345/164 |
| 6,822,683 B1 | 11/2004 | Torikai | 348/333.13 |
| 6,931,592 B1 * | 8/2005 | Ramaley et al. | 715/530 |
| 6,970,182 B1 * | 11/2005 | Schultz et al. | 348/86 |
| 2001/0044318 A1 | 11/2001 | Mantyjarvi et al. | 455/550 |
| 2002/0140675 A1 * | 10/2002 | Ali et al. | 345/158 |
| 2003/0055655 A1 | 3/2003 | Suominen | 704/276 |
| 2003/0104800 A1 | 6/2003 | Zak | 455/404 |
| 2003/0176205 A1 | 9/2003 | Oota et al. | 455/567 |

FOREIGN PATENT DOCUMENTS

| | | | |
|---|---|---|---|
| JP | 2000124970 A | | 4/2000 |
| JP | 2001094636 A | | 4/2001 |
| WO | WO 98/14863 | * | 4/1998 |
| WO | WO 99/22338 | | 5/1999 |

OTHER PUBLICATIONS

Harrison, Beverly L. et al, "Squeeze Me, Hold Me, Tilt Me! An Exploration of Manipulative User Interfaces," pp. 17-24 (Apr. 18-23, 1998), CHI '98.

Rekimoto, Jun, "Tilting Operations for Small Screen Interfaces (Tech Note)," pp. 167-168, UIST '96.

Schmidt, Albrect, "Implicit Human Computer Interaction Through Context," pp. 1-5, 2nd Workshop on Human Computer Interaction with Mobile Devices, 1999.

Schmidt, Albrect et al., "There Is More to Context Than Location," Environment Sensing Technologies for Adaptive Mobile User Interfaces, 5 pages, IMC '98.

Small, David et al., "Design of Spatially Aware Graspable Displays," Extended Abstracts of CHI '97, pp. 1-2 (Mar. 22-27, 1997).

Schmidt, Albrecht et al., "Advanced Interaction in Context," 13 pages, HUC '00.

Office Action (Jun. 13, 2005) and Response (Sep. 13, 2005) from U.S. Appl. No. 10/162,487, filed Jun. 3, 2002.

Office Action (Jul. 22, 2005) and Response (Sep. 27, 2005) from U.S. Appl. No. 10/294,286, filed Nov. 14, 2002.

Office Action (Apr. 17, 2006) from U.S. Appl. No. 10/162,487, filed Jun. 3, 2002.

Hinckley et al., "Sensing Techniques for Mobile Interaction," CHI Letters vol. 2, 2; Copyright 2000, ACM 1-58113-232-3, pp. 91-100.

Office Action (Apr. 6, 2006) from U.S. Appl. No. 10/294,286, filed Nov. 14, 2002.

Office Action (Dec. 1, 2005) and Response (Apr. 21, 2005; Jan. 25, 2006) from U.S. Appl. No. 10/162,487, filed Jun. 3, 2002.

Office Action (Nov. 2, 2005) and Response (Oct. 11, 2005; Dec. 9, 2005; Feb. 2, 2006) from U.S. Appl. No. 10/294,286, filed Nov. 14, 2002.

Office Action (Jan. 7, 2005) and Response (Mar. 14, 2005) from U.S. Appl. No. 10/162,487, filed Jun. 3, 2002.

RotoView™ By Innoventions, How It Works.

RotoView™ By Innoventions, The Intuitive Display Navigation Solution for Hand Held Devices.

RotoView™ By Innoventions, Features and Specifications.

RotoView™ By Innoventions, The Intuitive Display Navigation Solution for Hand Held Devices.

Innoventions' RotoView™, The Intuitive Display Navigation Solution for Hand Held Devices, Background and Problem Definition.

* cited by examiner

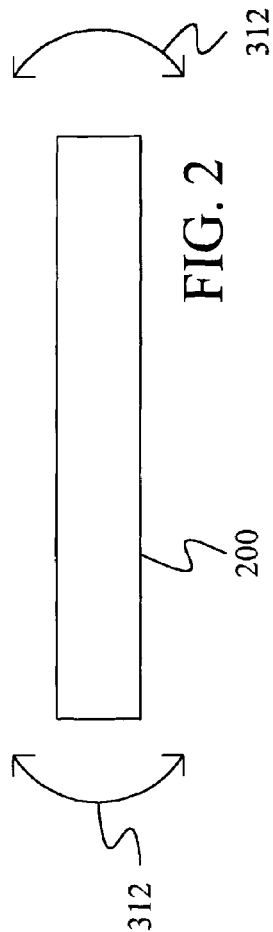

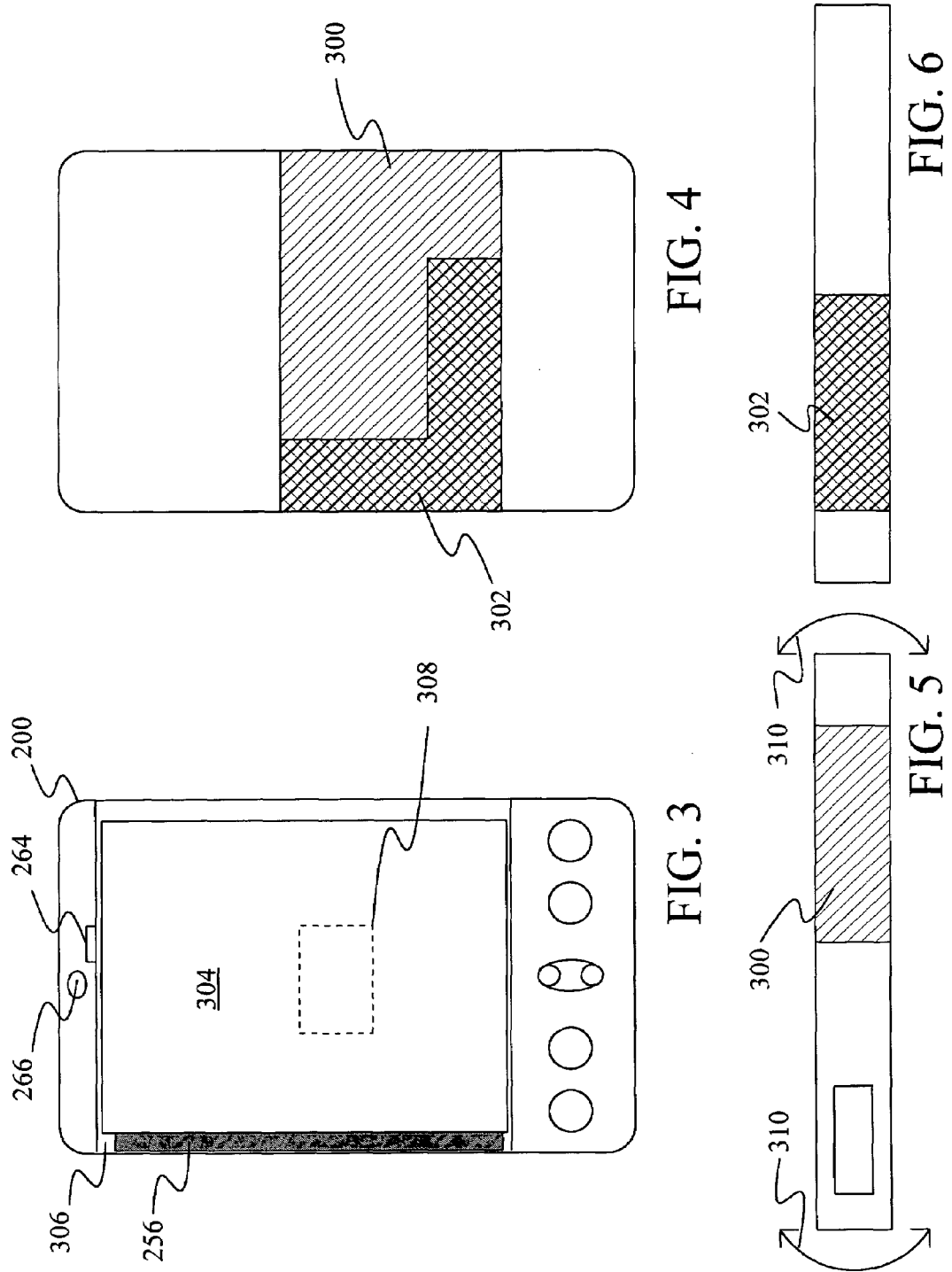

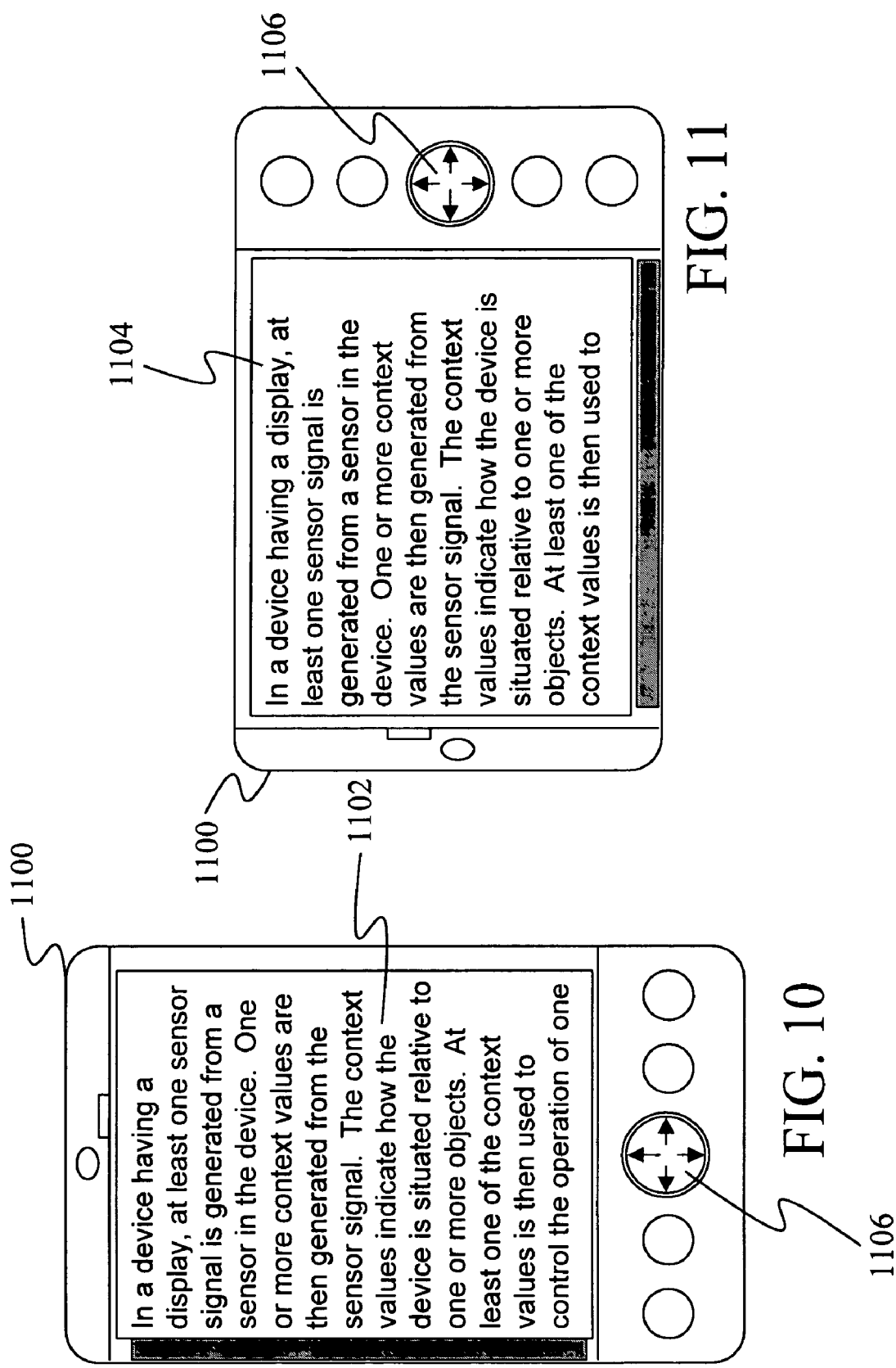

METHOD AND APPARATUS USING MULTIPLE SENSORS IN A DEVICE WITH A DISPLAY

REFERENCE TO RELATED APPLICATION

The present invention claims priority from a U.S. Provisional application having Ser. No. 60/218,748, filed on Jul. 17, 2000 and entitled "METHOD AND APPARATUS USING MULTIPLE SENSORS IN A MOBILE DEVICE."

BACKGROUND OF THE INVENTION

The present invention relates to devices with displays. In particular, the present invention relates to computing and mobile devices.

Mobile devices, such as personal information managers (PIMs), cellular telephones, pagers, watches, and wearable computers typically include one or more buttons or touch screens through which the mobile device receives explicit instructions from the user. For example, the user can press buttons to explicitly instruct the device to enter a full-power mode, activate an application, or scroll through an image on the display.

Although the devices are responsive to information provided through such explicit instructions, they are generally not responsive to information that is present in the manner in which the device is being handled by the user. For example, the devices do not automatically enter a full-power mode, even when the user is holding the device in a manner that is consistent with wanting to use the device.

The reason these devices are not responsive to such handling information is that they typically are not equipped with the sensors needed to detect the information nor with the software needed to interpret the information.

Because these devices are generally not responsive to the manner in which the user is holding the device, the user is forced to enter explicit instructions into the device to achieve various functions. In light of this, mobile devices are needed that can sense how they are being handled in order to perform certain background functions that expand the functionality of the mobile device without requiring the user to perform any additional actions.

SUMMARY OF THE INVENTION

In a device having a display, at least one sensor signal is generated from a sensor in the device. One or more context values are then generated from the sensor signal. The context values indicate how the device is situated relative to one or more objects. At least one of the context values is then used to control the operation of one or more aspects of the device.

The invention includes several aspects. In one aspect, an image on a display is scrolled at a rate that is based on the difference between a current tilt angle and a tilt angle when tilt scrolling was activated. A further aspect of the invention adjusts the contrast of a display based on the tilt angle of the display.

Other aspects of the invention control the power mode of the device based on whether it is being handled, its orientation, and/or whether it is being gestured toward.

Still further aspects of the invention activate applications based on the device being in a particular orientation while being held by the user.

BRIEF DESCRIPTION OF THE DRAWINGS

FIG. 2 is a bottom view of a mobile device of one embodiment of the present invention.

FIG. 3 is a front view of the mobile device of FIG. 2.

FIG. 4 is a back view of the mobile device of FIG. 2.

FIG. 5 is a left side view of the mobile device of FIG. 2.

FIG. 6 is a right side view of the mobile device of FIG. 2.

FIG. 8 is a block diagram of components used to practice several embodiments of the present invention.

FIG. 10 is a front view of a mobile device in a portrait orientation.

FIG. 11 is a front view of a mobile device in a landscape orientation.

DETAILED DESCRIPTION OF THE PREFERRED EMBODIMENTS

Figure 1:
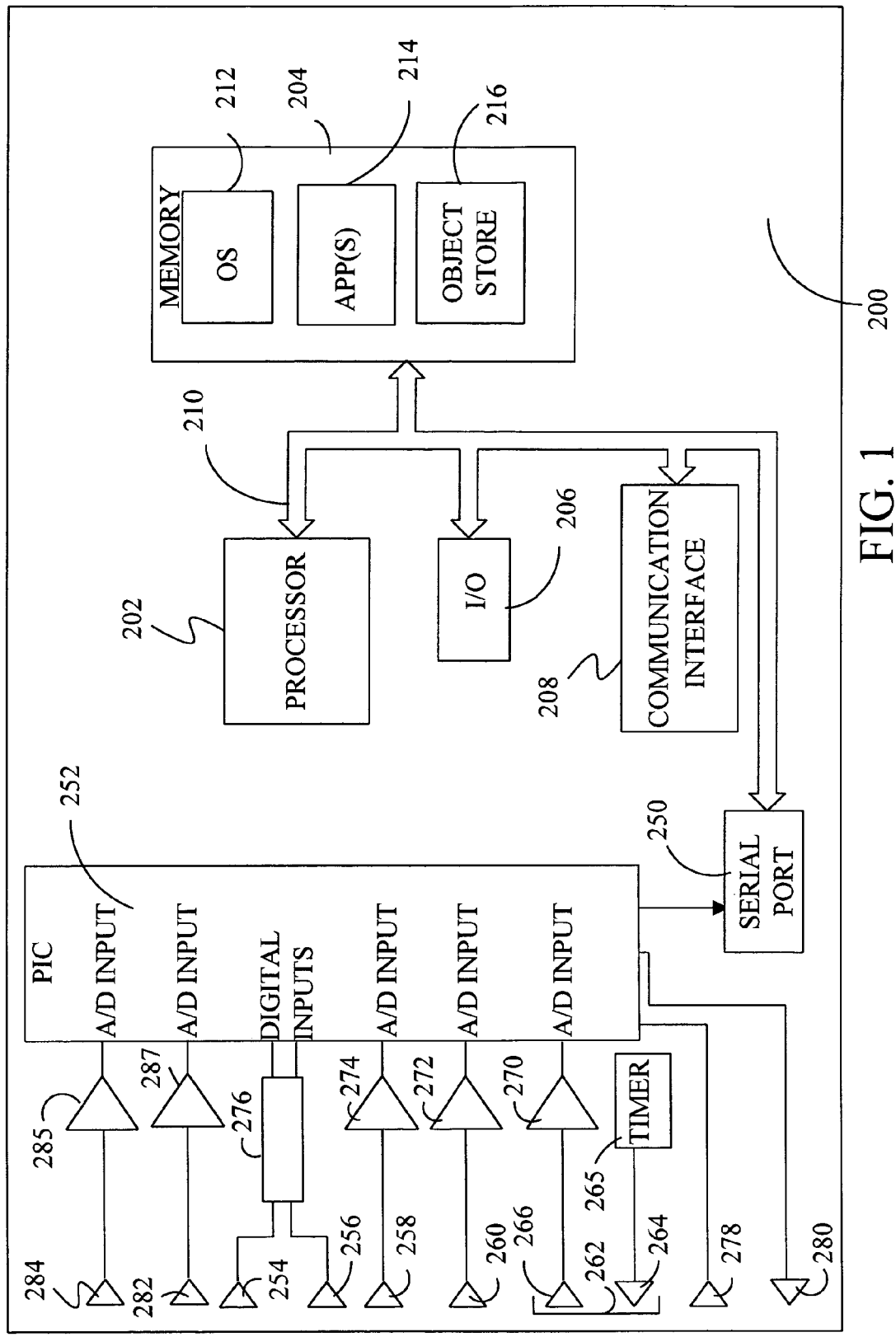
FIG. 1 is a block diagram of the components of a mobile device under one embodiment of the present invention.

FIG. 1 is a block diagram of a mobile device 200, which is an exemplary environment for embodiments of the present invention. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as a non-volatile electronic memory such as a random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214, and an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212 at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices that have previously been found on mobile devices such as a touch-sensitive screen, buttons, rollers, and a microphone as well as a variety of output devices including an audio generator, a vibrating device, and a display. The devices listed above are by way of example and need not all be present on mobile device 200.

Mobile device 200 also includes additional input devices under the present invention. Under one embodiment, these input devices are connected to the mobile device through a separate serial port 250 and a peripheral interface controller (PIC) microprocessor 252. In other embodiments, these additional devices are connected to processor 202 through communication interface 208 and PIC microprocessor 252 or through PIC microprocessor 252 directly. Under one embodiment, a microchip 16C73A peripheral interface controller is used as the PIC microprocessor. In still further embodiments, PIC microprocessor 252 is not present and the input devices are connected to processor 202 through various ports such as serial port 250 or through communication interface 208.

Under the embodiment of FIG. 1, The additional input devices include two touch sensors 254 and 256, a forward/back tilt sensor 258, a left/right tilt sensor 260, a proximity sensor 262 consisting of an infrared transmitter 264 and an infrared receiver 266, a digital compass 284, and a gravity switch 282. The sensing signals from the infrared receiver 266, left/right tilt sensor 260, forward/back tilt sensor 258, digital compass 284, and gravity switch 282 are provided through respective amplifiers 270, 272, 274, 285 and 287 to analog inputs of PIC microprocessor 252. These analog inputs are connected to analog-to-digital converters within PIC microprocessor 252. In other embodiments, the sensors provide a digital output and thus are connected to digital inputs on the microprocessor.

In the embodiment of FIG. 1, touch sensors 254 and 256 are provided to a separate peripheral interface controller microprocessor 276 which converts the touch signals into digital values and provides the digital values to PIC microprocessor 252. In other embodiments, touch sensors 254 and 256 are connected directly to analog or digital inputs in PIC microprocessor 252 instead of being connected to PIC 276 or are connected to processor 202.

PIC microprocessor 252 also includes a connection to the power bus of mobile device 200, which is shown as connection 278 in FIG. 1. PIC microprocessor 252 also includes a connection to a power switch 280, which enables PIC microprocessor 252 to turn mobile device 200 on and off. Note that PIC microprocessor 252 always receives power and, under one embodiment, is able to control which of the sensors receives power at any one time. This allows PIC microprocessor 252 to manage power consumption by only sending power to those sensors that it anticipates will need to be active.

Under one embodiment, PIC microprocessor 252 continuously samples the sensors and transmits packets representing the state of these sensors at a rate of approximately 400 samples per second through serial port 250. In some embodiments, samples are reported at lower speeds to conserve power and processing resources. Some sensors may be reported at different sampling rates than others (e.g. tilt may be updated more frequently than touch).

Under one embodiment, touch sensor 254 is a capacitive touch sensor that is divided into two regions. In other embodiments, it is also possible to implement this sensor with a single detector pad. This touch sensor is spread across the back and sides of mobile device 200. This is shown in more detail in FIGS. 4-6 which show a back, left side view and right side view of the outside of mobile device 200. In FIGS. 4, 5, and 6, touch sensor 254 is shown as two regions 300 and 302. Region 300 extends from the left side to the back of mobile device 200 and region 302 extends from the right side to the back of mobile device 200. When a user touches either section 300 or 302, the capacitance associated with the touched section changes indicating that the user has touched the device. Note that although the touch sensors are shown on the exterior of the device in the embodiment of FIGS. 4-6, in other embodiments, the touch sensor is located beneath an outer covering of the device.

Touch sensor 256 is shown in FIG. 3, which is a front view of mobile device 200. In the embodiment of FIG. 3, touch sensor 256 is located on the left bezel of display screen 304. In other embodiments, touch sensor 256 is located on the outer casing on the front portion of mobile device 200, but not necessarily on bezel 306 of mobile device 200.

In some embodiments, the touch sensors described above are realized using a plurality of independent touch sensors that each provides a separate touch signal. In other embodiments, the touch sensors are replaced with position sensors that indicate the location where the user is touching the device. Those skilled in the art will recognize that additional touch sensors may be added to the mobile device within the scope of the present invention.

Left/right tilt sensor 260 and forward/back tilt sensor 258 are shown as a single dotted element 308 in FIG. 3. These tilt sensors are embedded within the casing of mobile device 200 and in one embodiment are located at a point about which users typically pivot mobile device 200 when tilting the device. Note that the tilt sensor's position within the mobile device is unimportant as it senses only the angle of its physical attitude with respect to gravity. The sensor's angular position within the device is important.

Under one embodiment, an Analog Devices ADXL05 two-axis linear accelerometer is used for tilt sensors 258 and 260. Such a sensor detects forward/backward tilt, shown by arrows 310 of FIG. 5, and left/right tilt, shown in the bottom view of FIG. 2 as arrows 312. The sensor also responds to linear accelerations, such as those resulting from shaking the device. Typically, the tilt sensor has a response curve both in the forward/back direction and left/right direction with the form:

$$\text{Angle} = \sin^{-1}\left(\frac{T - T_c}{k}\right) \qquad \text{EQ. 1}$$

where T is the tilt sensor value, $T_c$ is the sensor value at 0° tilt, and k is a gain parameter. In embodiments where the sensor cannot detect the sign of the gravity vector, it is unable to determine if the user is holding the device with the display facing up or down. Gravity switch 282 of FIG. 1 is thus provided in some embodiments to indicate whether the display is facing the ground. In other embodiments, a three-axis accelerometer is used to provide the sign of the gravity vector.

In addition, the tilt sensors do not respond to rotation about an axis running from the front to the back of the mobile device. Thus, the tilt sensors are unable to sense the spinning of the mobile device on its back when laid on a flat table. Digital magnetic compass 284 of FIG. 1 is thus provided in some embodiments to indicate this type of rotation. In other embodiments, solid state gyros are used instead of the compass.

When present, gravity switch 282 and digital compass 284 are also internal to mobile device 200. They are not shown in FIG. 3 to reduce the complexity of FIG. 3.

Note that the additional input devices of FIG. 1 do not all have to be present under the present invention. Different embodiments of the invention will use different numbers of and different combinations of these additional sensors. Further, additional sensors may be added without affecting the functions of the sensors discussed in the present application.

Transmitter 264 and receiver 266 of proximity sensor 262 are shown in FIG. 3. In the embodiment of FIG. 3, transmitter 264 is shown below and to the right of receiver 266, and both the transmitter and receiver are located at the top front of mobile device 200.

Under one embodiment, a timer 265 drives transmitter 264 at 40 kilohertz and transmitter 264 is an infrared light emitting diode with a 60° beam angle. Under such embodiments, receiver 266 is also an infrared receiver that is capable of operating at the same frequency as transmitter 264. The light produced by transmitter 264 bounces off objects that are near mobile device 200 and the reflected light is received by receiver 266. Receiver 266 typically has an automatic gain control such that the strength of the received signal is proportional to the distance to the object.

Figure 7:
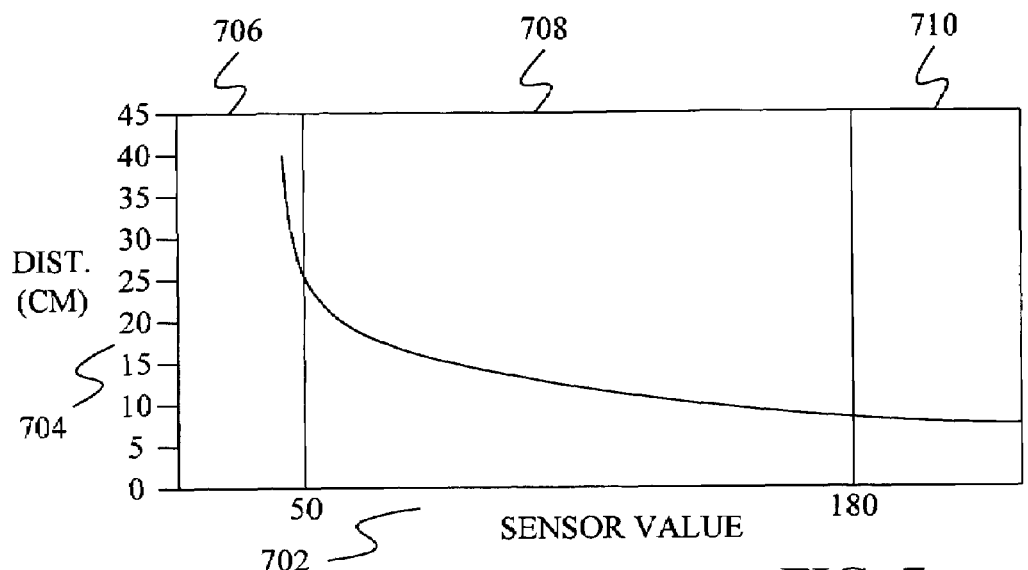
FIG. 7 is a graph of distance between a user and a mobile device as a function of proximity sensor levels.

FIG. 7 shows a response curve for one embodiment of the proximity sensor. In FIG. 7, the sensor value is shown along horizontal axis 702 and the actual distance to the object is shown along vertical axis 704. The graph of FIG. 7 is divided into three ranges. Range 706 extends from a distance of approximately 27 centimeters to infinity and indicates that no objects are within range of mobile device 200. Range 708 extends from approximately 7 centimeters to 27 centimeters and indicates that at least one object is within range of mobile device 200. Readings in third range 710, which extends from 7 centimeters to 0 centimeters, are considered to be close to mobile device 200. The response curve of FIG. 7 is described by the following equation:

$$Z_{cm} = \frac{k}{\left(\frac{p}{p_{max}} - c\right)^a} \quad \text{EQ. 2}$$

where $z_{cm}$ is the distance in centimeters to the object, p is the raw proximity reading, $p_{max}$ is the maximum sensor reading, c is a constant, $\alpha$ is a nonlinear parameter (0.77 in one embodiment), and k is a gain factor.

Under one embodiment, the power consumed by proximity sensor 262 is limited by pulsing transmitter 264 a few times a second when the user is out of range, or by reducing the duty cycle of timer 265.

In other embodiments, IR receiver 266 generates a digital signal instead of the analog signal shown in FIG. 1. The digital signal provides a representation of the transmitted signal. However, as the distance between the device and the user increases, the number of errors in the digital signal increases. By counting these errors, PIC 252 is able to determine the distance between the user and the device.

FIG. 8 provides a block diagram of the software components of one embodiment of the present invention. In FIG. 8, a context information server 800 receives the sensor data from serial port 250 of FIG. 1.

Context information server 800 acts as a broker between the sensor values received by the microprocessor 252 and a set of applications 802 operating on mobile device 200. Context information server 800 continuously receives sensor data packets from PIC 252, converts the raw data into a logical form, and derives additional information from the sensor data.

Applications 802 can access the logical form of information generated by context information server 800 either by polling a block of shared memory 804 in which context information server 800 stores the logical form information, or alternatively by asking context information server 800 to provide a specific piece of information via a system event message when a specific sensor value changes.

In addition, applications can post certain context information with context information server 800 so that it may be shared with other applications. Such posting is described in greater detail in context with one embodiment of the present invention described below.

In FIG. 8, a first in/first out memory stack 806 is also provided that stores a history of past states for mobile device 200. These past states are used in certain embodiments of the present invention as described further below.

Tables 1, 2, 3 and 4 below provide lists of the context variables that can be generated by context information server 800. In the description column of each table, specific values for the variables are shown in italics. For example, the DISPLAYORIENTATION variable can have Display Orientation context values of flat, portrait, landscape left, landscape right, or portrait upside down.

TABLE 1

| Group | Context Variable | Description |
|---|---|---|
| Touch | Holding&Duration | Whether or not the user is holding the device and for how long |
|  | TouchingBezel& Duration | Whether user is touching screen bezel and for how long |

TABLE 2

| Group | Context Variable | Description |
|---|---|---|
| Tilt/ Accelerometer | TiltAngleLR, TiltAngleFB | Left/Right and Forward/Back tilt angles in degrees |
|  | DisplayOrientation, Refresh | Flat, Portrait, LandscapeLeft, LandscapeRight, or Portrait-UpsideDown. A Refresh event is posted if apps need to update orientation |
|  | HzLR, MagnitudeLR, HzFB, Magnitude FB | Dominant frequency and magnitude from FFT of tilt angles over the last few seconds |
|  | LookingAt, Duration | If user is looking at display |

TABLE 2-continued

| Group | Context Variable | Description |
|---|---|---|
| | Moving & Duration | If device is moving in any way. |
| | Shaking | If device is being shaken |
| | Walking, Duration | If user is walking |

TABLE 3

| Group | Context Variable | Description |
|---|---|---|
| Proximity | Proximity | Estimated distance in cm to proximal object |
| | ProximityState, Duration | Close, InRange, OutOfRange, AmbientLight (when out-of-range and bright ambient light is present) |

TABLE 4

| Group | Context Variable | Description |
|---|---|---|
| Other | Scrolling | If user is currently scrolling (posted by scroll app) |
| | VoiceMemoGesture | If recording a voice memo. (posted by voice recording app) |

The context variables of Table 1 are generated based on signals from the touch sensors, those in Table 2 are generated based on tilt sensors, those in Table 3 are generated based on the proximity sensors, and those in Table 4 are posted by other applications and are not generated directly from the sensor data.

The sensors described in FIG. 1 have many novel uses under the present invention. Each of these uses is described below.

Activating an Audio Receiver

Many applications on mobile devices activate an audio receiver to receive an audio input that is further processed. For example, the audio signal can be recorded, can be used as input to a speech recognition system, or can be transmitted.

Typically, devices have activated their audio receiver based on the user pressing a button or activating a particular application. Thus, the user must physically manipulate a button or keyboard in order to activate and deactivate the audio receiver.

The present invention provides a means for automatically activating an audio receiver based on how the user is holding the input device.

In its most basic form, the present invention activates the audio receiver based on a proximity sensor that senses when the input device is close to the user. In more complex embodiments, the input device must also be held by the user before the audio receiver will be activated; this prevents accidental activation of the audio receiver when the device is in a purse or briefcase. In the embodiment of FIGS. 2-6, the user is considered to be holding the device when the touch sensors on the side and back of the device are activated.

In still more complex embodiments, the user must also tilt the device before the audio receiver will be activated. For instance, in one embodiment, the user must hold mobile device 200 in an almost vertical position. Under one embodiment, the angle of tilt must be within a specific range. Since users typically tilt an input device to the left and back when making the gesture associated with wishing to speak into the input device, both left/right tilt and forward/back tilt can be examined to determine if the tilt is proper. These tilt angles correspond to the approximate angle at which one would hold a device such as a mobile phone when speaking into it. Several ranges of tilt signals can be used, such that tilting will be recognized if the device is held either in the left or the right hand.

Figure 9:
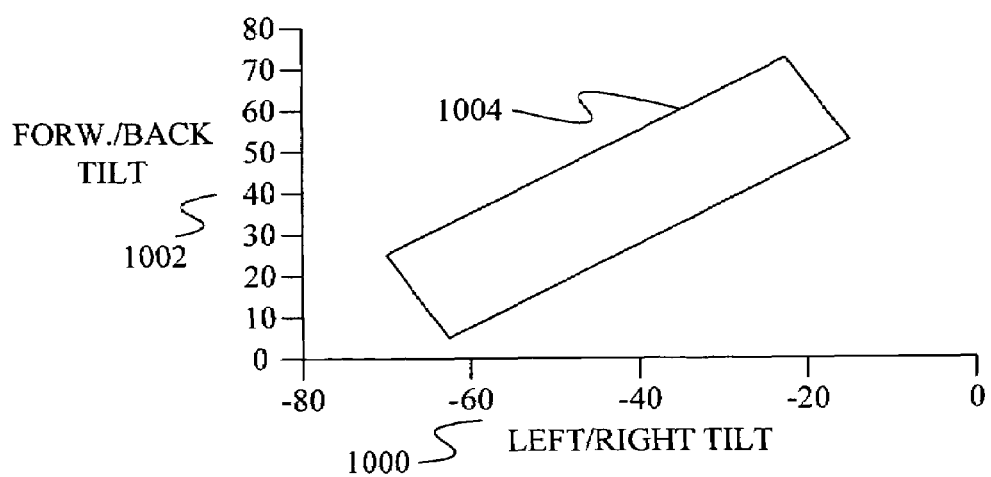
FIG. 9 is a graph of left-right tilt versus forward-back tilt showing those tilt angles that activate an audio device.

This can be seen in FIG. 9, which shows left/right tilt along horizontal axis 1000 and forward/back tilt along vertical axis 1002. A block 1004 indicates the acceptable ranges for left/right and forward/back tilt for activating the audio receiver.

The conditions of being held, having the device in close enough proximity, and having the device properly tilted must all be met for at least 0.1 seconds before the audio receiver is activated under one embodiment of the present invention.

In embodiments that use proximity, touch, and tilt to determine when to activate the audio receiver, the audio receiver is deactivated if any one of these criteria stops being met. For example, if the user stops holding the device, or the user takes the device away from their mouth, the audio receiver would be deactivated.

Under some embodiments, to assist the user in knowing when the audio receiver is active, a sound is emitted by mobile device 200 when the receiver is activated. Another sound is then emitted when the audio receiver is deactivated. In still further embodiments, a separate sound is provided to indicate that the gesture is proper for activating the audio receiver before the audio receiver is actually activated.

Using the context variables of Tables 1-4, an application would determine whether to activate its audio receiver based on the HOLDING and DURATION context variable, the TiltAngleLR and TiltAngleFB context variables, and the Proximity or ProximityState context variables. In some embodiments, the sequence of recent values is used to determine a composite gesture, rather than just comparing instantaneous values.

As noted above, the activation of an audio receiver can be used when recording an audio message, when applying an audio signal to a speech recognition system or when transmitting a voice signal either across a computer network or through a cellular network. In addition, the activation of an audio receiver can be made through a phone, or any hand held device that is capable of receiving audio signals.

It is thought by the present inventors that by eliminating the need to press an activation button, the user is able to concentrate more on other tasks while speaking into the audio receiver. Thus, since the user does not have to concentrate on pressing and maintaining tension on a particular button, they are better able to concentrate on other tasks while speaking.

Although the above embodiment has been described in connection with activating an audio receiver, it may be generalized to starting other applications based on the mobile device being placed in an appropriate orientation for the application. For example, if the user is holding the device in an orientation that is indicative of listening to the device, an application that automatically plays voice mail could be activated. Another example would be answering a call on a cell phone: when the phone rings, the user picks it up and places it next to his or her ear to answer the call. Because of the sensed gesture, there is no need to perform secondary preparatory actions to answer the call (such as pressing a TALK button or opening a flip-top cover). Such preparatory actions are unnecessary under the present invention and as such the present invention eliminates extra steps that may be distracting or unfamiliar to the user.

Changing Display Orientation

In other embodiments of the present invention, the tilt sensor is used to detect the orientation of the mobile device so that the image on the display of the mobile device may be matched to the mobile device orientation.

FIG. 10 provides an example of a mobile device 1100 in an upright orientation. In FIG. 10, the present invention displays an image 1102 of a set of text in a portrait orientation to match the orientation of mobile device 1100. FIG. 11 shows the same mobile device rotated counterclockwise 90°. Under the present invention, this rotation is sensed by the tilt sensors and in response, a new image 1104 of the set of text is displayed. In particular, image 1104 shows the text in a landscape view to match the new orientation of mobile device 1100.

Under the present invention, the displayed image may be matched to the orientation of the device through a simple rotation of the display image or through a redrawing of the display image based on the orientation of the device and the relative dimensions of the display in that orientation.

A simple rotation is typically performed by using the center of the screen as the center of rotation. For such rotations, a transform of points x, y in the document to a point x', y' on the screen is given by equation 3:

$$m = T \cdot R \cdot T^{-1} \qquad \text{EQ. 3}$$

where T is a translation and R is the 2D rotation matrix for 0°, 90°, 180°, or 270°.

A redrawing of the image that takes the dimensions of the display into consideration allows applications to change the contents of the image before redrawing the image. For instance, a word processing application can recalculate word wrapping based on the dimensions of the display in its new orientation. Thus, the number of words per line will change when the image is drawn in its new orientation. An example of this effect can be seen by comparing the text in image 1102 to the text in image 1104.

Context information server 800 causes the image to be refreshed by sending an appropriate notification to applications 802. These applications then generate a new image for the display.

Figure 12:
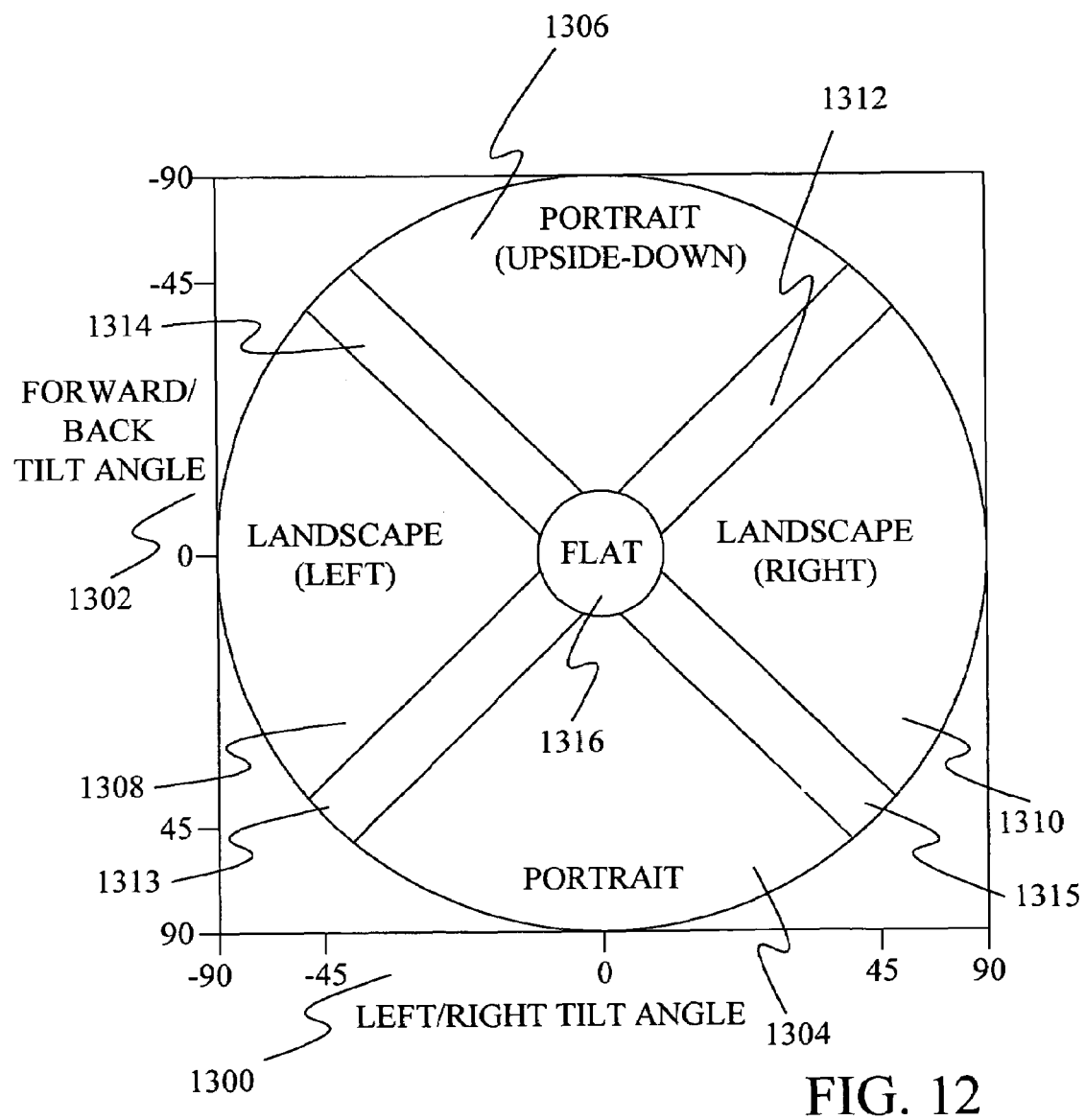
FIG. 12 is a chart showing the display orientations for various combinations of forward/back tilt and left/right tilt.

To determine the orientation of the mobile device, most embodiments of the present invention examine both the left/right tilt of the mobile device and the front/back tilt. FIG. 12 provides a graph showing the display orientation context values determined by context information server 800 for various combinations of left/right tilt context values and forward/back tilt context values, found in the TiltAngleLR context variable and the TiltAngleFB context variable, respectively. In FIG. 12, left/right tilt context values are shown along horizontal axis 1300 and forward/back tilt context values are shown along vertical axis 1302. In FIG. 12, there are four orientation regions 1304, 1306, 1308, and 1310, which are separated by deadbands 1312, 1313, 1314 and 1315. FIG. 12 also includes a flat area 1316, that corresponds to the mobile device being laid flat.

Orientation area 1304 is related to an upright portrait orientation for a mobile device such as mobile device 1100 of FIG. 10. This is the typical or natural way for a user to hold the mobile device. Orientation areas 1308 and 1310 are associated with a rotation of the mobile device counterclockwise and clockwise 90°, respectively. Orientation area 1306 is associated with the mobile device being rotated 180° so that is upside down.

Transitions between these areas nominally occur when the left/right tilt equals the forward/back tilt. As shown by deadbands 1312, 1313, 1314 and 1315, the display does not switch immediately at these angles. Instead, there is a plus or minus 5° deadband to prevent jitter. Thus, the device must tilt through the entire deadband zone before context information server 800 of FIG. 8 will issue a new orientation value. In some embodiments, there is a further 0.5 second time-out. The orientation of the device must remain at the new orientation for 0.5 full seconds before the display format changes.

Under some embodiments of the present invention, the mobile device's directional inputs are also remapped to match the orientation of the mobile device. For example, directional input 1106 of FIGS. 10 and 11 has a different mapping in the two figures. In FIG. 10, pressing directional input 1106 toward the screen corresponds to moving upward through the text. In FIG. 11, pressing directional input 1106 toward the screen corresponds to moving left through the text.

Under one embodiment of the present invention, the orientation of the display is stabilized to avoid undesired switching of the displayed orientation as the user places the mobile device on a flat surface. During the process of placing a mobile device on a flat surface, it is common for the user to tip the mobile device slightly in one or more directions. Without the stability provided by this embodiment, the display may switch to other orientations that the user does not want.

Under one embodiment of the present invention, orientation stability is maintained by using a first-in-first-out queue of recent display orientations. Such a queue is shown as FIFO 806 in FIG. 8. The FIFO-queue includes a list of recent display orientations.

When the user puts down the device, indicated by the tilt sensors indicating the device is flat and the touch sensors indicating that the device is not being held, context information server 800 searches through FIFO 806 to find the most recent stable orientation other than flat. An orientation is considered stable if it was maintained for more than 1 or 2 seconds. This stable orientation is then selected as the orientation to be used while the device remains flat.

Tilt Scrolling

Under embodiments of the present invention, a user can scroll through a displayed document, spreadsheet, or image, simply by tilting the input device. In most embodiments, the user indicates their desire to use tilt scrolling by touching the touch pad on the bezel of the mobile device. Although in the embodiments discussed below, a touch sensor is used to indicate a desire to begin tilt scrolling, other inputs can be used within the scope of the present invention to indicate that the user wishes to begin tilt scrolling.

Under one embodiment of the invention, when the user indicates that they wish to begin tilt scrolling, the mobile device captures the current forward/back tilt and left/right tilt and uses these tilt angles as the starting orientation for the device. The direction and speed of scrolling is then determined relative to this starting orientation.

By capturing this starting orientation, the present invention keeps the displayed image from scrolling until the user tilts the device from its initial position. This makes the scrolling behave in a more predictable manner and is different from prior art tilt scrolling devices. In prior art devices, the direction and speed of the scrolling is determined relative to tilt angles of zero or tilt angles that the user must set using a separate command to "recenter" the device. As such, the device will begin to scroll immediately if the device is tilted when the user indicates that they want to activate tilt scrolling. The present invention improves on the use of a "recenter" command by combining recentering with the initiation of scrolling (i.e. as soon as the user touches the bezel to start scrolling, this also resets the starting angles for the tilt).

Under the present invention, the rate and direction of forward/back scrolling is related to the angle of forward/back tilting by:

$$v_{fb} = k \cdot \mathrm{sgn}(dA_{fb}) \cdot \max(\|dA_{fb}\| - dA_{min}, 0)^{\alpha} \qquad \mathrm{EQ.\ 4}$$

where $v_{fb}$ is the calculated velocity for the forward-backward scrolling, k is the control gain, $dA_{fb}$ is the change in the forward/back tilt angle relative to a beginning orientation, $dA_{min}$ is the size of a dead band, and a is a non-linear parameter. Under one embodiment, k=0.2, α=1.6 and $dA_{min}$=1°-4°. A similar equation is used to determine left/right scrolling based on left/right tilt angle.

The scrolling control can be single axis where the device examines the left/right tilt and the forward/back tilt and only scrolls along the axis with the larger tilt angle. Thus, if the relative forward/back tilt is larger than the relative left/right tilt, the image is scrolled based only on the forward/back tilt. Alternatively, the scrolling control may be mixed exclusive axis, where a square dead band is applied around the zero tilt point, such that small tilts are ignored. For instance, if a user tilts the device a small amount forward but a large amount left, the image will only scroll left. However, if the user increases the forward tilt, the image will scroll diagonally. Lastly, the scrolling control can be a dual axis control in which both forward/back tilt and left/right tilt are used at the same time to scroll the image without a dead band.

Under one embodiment of the present invention, tilt scrolling is combined with the orientation matching described above. This represents a significant challenge since both techniques utilize the tilting of the device for changing the display.

Under the present invention, once scrolling has been initiated, the tilt of the device is only applied to the scrolling and is not used to change the orientation of the display. Thus, tilting the mobile device will not cause the orientation to switch until scrolling is deactivated.

The application that is controlling the scrolling helps to enforce this rule by posting a scrolling value with Context Information Server 800. This value is shown in Table 4. Once this value is posted, Context Information Server 800 suspends updates to the DISPLAYORIENTATION value until scrolling has stopped.

In addition, when the user releases the scrolling button or the scrolling touch sensor, the system does not automatically change the orientation based on the current tilt. Instead, the system allows the user 1 or 2 seconds to return the mobile device to the position it was in when scrolling was initiated. After that waiting period, the orientation of the image is changed to match the orientation of the mobile device.

Scrolling Without Menu Bar and Start Bar

In many applications, a displayed document is shown with banners that provide menus, scroll bars, and/or command icons. Under one embodiment of the present invention, the inventors have discovered that users do not need the command menus or the command icons during scrolling. Thus, under one embodiment of the invention, applications remove their menu bars and command bars from the display during scrolling. Note that this invention is not limited to mobile devices and may be used on any computing system or with any type of mobile device. By removing the menu bars or command icons, more screen area is available for showing the image that is being scrolled. This makes it easier for the user to find the information they want.

The removal of the command bars during scrolling is independent of tilt scrolling. In other words, the aspect of removing command bars may be practiced regardless of how the scrolling is initiated.

Under one embodiment, the input used to remove the menu bars and command icons is the same as that used to initiate scrolling. For example, in a tilt scrolling application, the menu bar and command icons disappear as soon as the user presses the button or touch sensor that indicates that tilt scrolling is to be initiated. Under such embodiments, a larger dead zone from the zero orientation angle may be needed to ensure that the image does not scroll when the user just wants to view the full screen.

Selective Display of Toolbars

Under some embodiments of the present invention, several touch sensors are provided on the mobile device. For a given application, each touch sensor is associated with a different toolbar. When the user is touching a particular touch sensor, its corresponding toolbar is displayed. However, when the user is not touching the touch sensor, the toolbar is hidden so that more of the document or image may be displayed. In some embodiments, the touch sensor may be associated with an entire application (rather than just a toolbar) so that the user may switch applications temporarily by maintaining contact with the touch sensor. In this case, further interaction with the application using the stylus (touch-screen) causes the switch to become permanent.

Display Contrast Adjustment

One problem encountered when using a tilted liquid crystal display is that as the display is tilted away from the user, the contrast of the displayed image is lessened. The present invention improves the displayed image by increasing the contrast of the display as the user tilts the display away from them. Note that this aspect of the present invention is not limited to personal information managers and may be used with any LCD device such as a pager, watch, laptop computer, cell phone, or stand alone LCD display. Under one embodiment, the contrast is set according to the following equation:

$$\text{contrast} = m \cdot dA_{fb} + b \quad \text{EQ. 5}$$

where m is a constant equal to −0.135, b is a constant equal to 5.25, $dA_{fb}$ is the change from the ideal viewing angle as measured by a tilt sensor in the display, and "contrast" is the change in the contrast setting. Note that these values correspond to the software contrast settings of 1-10 available on the Cassiopeia E105 device. To prevent hysteresis, a tilt angle change of more than 3° is typically required before the contrast is adjusted.

Power Management

Under one embodiment of the present invention, a mobile device places itself in a full-power mode based on how the device is being handled. In one particular embodiment, the invention uses a combination of sensors to determine whether the user wants the device to be in full-power mode. In particular, the system uses a touch sensor to determine whether the user is holding the device and a tilt sensor to determine whether the user has properly oriented the device so that it is likely they are looking at it. By using both a touch sensor and an orientation sensor, the present invention avoids placing the device in full-power mode when it is in a briefcase.

In one particular embodiment, the orientation for full-power mode is a left/right tilt of between plus or minus 15°, a forward/back tilt of greater than −5°, and an upright portrait orientation. If the user maintains this orientation for at least 0.5 seconds, PIC microprocessor 252 of FIG. 1 places the device in full-power mode using power switch 280. The required time interval can be set as desired but is used to prevent powering up due to transient signals.

In other embodiments, the present invention prevents a mobile device from entering an idle mode if the user is handling the device or gesturing toward the device. In idle mode, the mobile device reduces the power consumption of the device by turning off the display. Typically, a mobile device will enter idle mode if the user has not pressed a button or touched the screen for some period of time. Under certain types of usage, users find that the system powers down when they would rather have it remain active. For instance, this often happens when the user is reading a large amount of text or is trying to interact with someone else while periodically relating to the text.

Under one embodiment of the invention, the device is prevented from entering an idle mode when context information server 800 determines that the user is holding the input device or when it determines that there is motion near the device. Such motion can be detected by changes in the output of the proximity sensor and is indicative of a user gesturing toward the device.

Note that this embodiment relies on motion and not just proximity. This is done to allow the device to enter idle mode when it is placed near a fixed object while it is not being used. For example, under the present invention, the device will still enter idle mode if a stack of paper is placed on top of the device.

Although the present invention has been described with reference to preferred embodiments, workers skilled in the art will recognize that changes may be made in form and detail without departing from the spirit and scope of the invention.

What is claimed is:

1. A method in a device having a display, the method comprising:
   generating at least one sensor signal using at least one sensor in the device;
   generating a first display orientation context value for longer than a set period of time that indicates how the device is oriented based on the at least one sensor signal;
   generating a second display orientation context value for shorter than the set period of time after generating the first display orientation context value based on the at least one sensor signal, the second display orientation context value differing from the first display orientation context value;
   generating a third display orientation context value that indicates that the device is laying flat based on the at least one sensor signal after generating the second display orientation context value; and
   selecting an orientation for an image on the display while the device is laying flat by using the first display orientation context value instead of the second display orientation context value.

2. The method of claim 1 further comprising generating a tilt context value that indicates how the device is tilted.

3. The method of claim 2 further comprising setting the mapping of directional inputs relative to the display based on the first display orientation context value.

4. The method of claim 2 further comprising changing a contrast level on a display based on the tilt context value.

5. The method of claim 2 further comprising scrolling an image on the display based on the tilt context value while generating the first display orientation context value, the rate of scrolling being based on the difference between a current tilt context value and an initial tilt context value that was determined when scrolling was initiated.

6. The method of claim 5 wherein scrolling an image comprises removing at least one tool bar from the display while scrolling the image.

7. The method of claim 1 further comprising generating a holding context value that indicates that the user is holding the device while generating the first display orientation context value and placing the device in a full power mode based on the holding context value and the first display orientation context value.

8. The method of claim 1 further comprising generating a holding context value that indicates that the user is holding the device and preventing the device from entering an idle mode based on the holding context value.

9. The method of claim 1 further comprising generating a sequence of proximity context values that indicate the proximity between the device and an object and preventing the device from entering an idle mode based on the sequence of proximity context values.

10. The method of claim 1 further comprising generating a holding context value that indicates that the user is holding the device while generating the first display orientation context value and activating an application based on the holding context value and the first display orientation context value.

11. The method of claim 10 wherein activating an application comprises activating a sound capturing application so that it captures sound.

12. A method in a device having a display, the method comprising:

generating at least one sensor signal using at least one sensor in the device that indicates the distance to an object without requiring the object to touch the device;

generating a sequence of proximity context values based on the sensor signal that indicate the movement of an object relative to the device; and preventing the device from entering an idle mode because the sequence of proximity context values indicates that an object is moving relative to the device while allowing the device to enter an idle mode when the sequence of proximity context values indicate that an object is present but not moving relative to the device.

13. The method of claim 12 further comprising generating at least one tilt sensor signal that indicates how the device is tilted and generating a tilt context value based on the at least one tilt sensor signal.

14. The method of claim 13 further comprising generating a display orientation context value based on the at least one tilt sensor signal that indicates how a display on the device is oriented.

15. The method of claim 14 further comprising setting the mapping of directional inputs relative to the display based on the display orientation context value.

16. The method of claim 14 further comprising:

generating a first display orientation context value for longer than a set period of time that indicates how the device is oriented based on the at least one sensor signal;

generating a second display orientation context value for shorter than the set period of time after generating the first display orientation context value based on the at least one sensor signal, the second display orientation context value differing from the first display orientation context value;

generating a third display orientation context value that indicates that the device is laying flat based on the at least one sensor signal after generating the second display orientation context value; and selecting an orientation for an image on the display while the device is laying flat by using the first display orientation context value instead of the second display orientation context value.

17. The method of claim 14 further comprising generating a holding context value that indicates that the user is holding the device and placing the device in a full power mode based on the holding context value and the display orientation context value.

18. The method of claim 14 further comprising generating a holding context value that indicates that the user is holding the device and preventing the device from entering an idle mode based on the holding context value.

19. The method of claim 14 further comprising generating a holding context value that indicates that the user is holding the device and activating an application based on the holding context value and the display orientation context value.

20. The method of claim 19 wherein activating an application comprises activating a sound capturing application so that it captures sound.

21. The method of claim 13 further comprising changing the contrast level on a display based on the tilt context value.

22. The method of claim 13 further comprising scrolling an image on the display based on the tilt context value, the rate of scrolling being based on the difference between a current tilt context value and an initial tilt context value that was determined when scrolling was initiated.

23. The method of claim 22 wherein scrolling an image comprises removing at least one tool bar from the display while scrolling the image.

24. A method in a device having a display, the method comprising:

generating at least one sensor signal using at least one sensor in the device;

generating a holding context value that indicates that the user is holding the device and at least one orientation context value that indicates that the device is in an orientation consistent with the user wanting to use the device based on the at least one sensor signal; and activating a sound capturing application based on the holding context value and the orientation context value.

25. A device with a display, the device comprising:

a sensor that generates a sensor signal;

a context information server that:

generates a first display orientation context value for longer than a set period of time that indicates how the device is oriented based on the sensor signal;

generates a second display orientation context value for shorter than the set period of time after generating the first display orientation context value based on the sensor signal, the second display orientation context value differing from the first display orientation context value; and generates a third display orientation context value that indicates that the device is laying flat based on the sensor signal after generating the second display orientation context value; and an application that draws an image on the display while the device is laying flat by using the first display orientation context value instead of the second display orientation context value.

* * * * *